United States Patent [19]
Thaxton

[11] 3,730,550
[45] May 1, 1973

[54] AIR-SPRING ASSEMBLY FOR VEHICLES

[75] Inventor: Ellis B. Thaxton, Arlington, Tex.

[73] Assignee: Ride-Rite Corp., Arlington, Tex.

[22] Filed: June 24, 1971

[21] Appl. No.: 156,188

[52] U.S. Cl. ..............................280/124 F, 267/31
[51] Int. Cl...............................................B60g 11/46
[58] Field of Search......................267/31, 32, 23, 24, 267/52, 54; 280/124 F, 124 A

[56] References Cited

UNITED STATES PATENTS

| | | | |
|---|---|---|---|
| 3,617,072 | 2/1971 | Turner | 280/124 |
| 2,874,956 | 2/1959 | La Belle | 267/31 X |
| 3,133,745 | 5/1964 | Granning | 280/124 FX |
| 3,031,179 | 4/1962 | Peirce | 267/31 |

Primary Examiner—Philip Goodman
Attorney—Arthur E. Dowell, Jr. et al.

[57] ABSTRACT

An air-spring assembly for mounting in a vehicle as a part of the vehicle suspension and including a pressure-inflatable elastomeric body having rigid end plates by which it is mounted between a chassis member and an axle member of the vehicle, the upper end plate carrying an inverted L-shaped bracket which is secured to the side of a frame member which extends longitudinally of the vehicle, and the lower end plate carrying an inverted U-bracket secured to the U-bolt and clamping plate assembly of the leaf spring mounted on the axle member of the vehicle.

2 Claims, 3 Drawing Figures

PATENTED MAY 1 1973 3,730,550
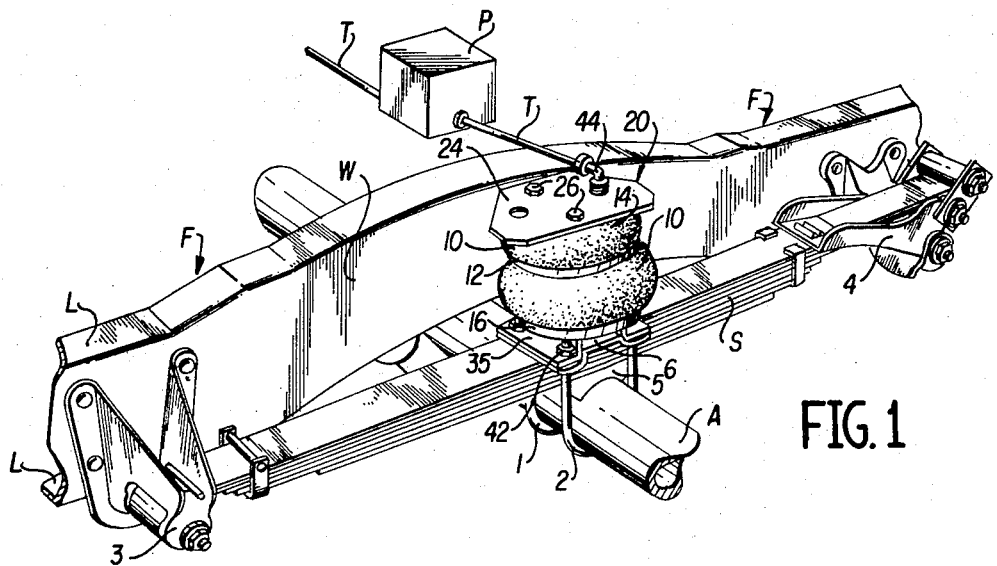
FIG. 1
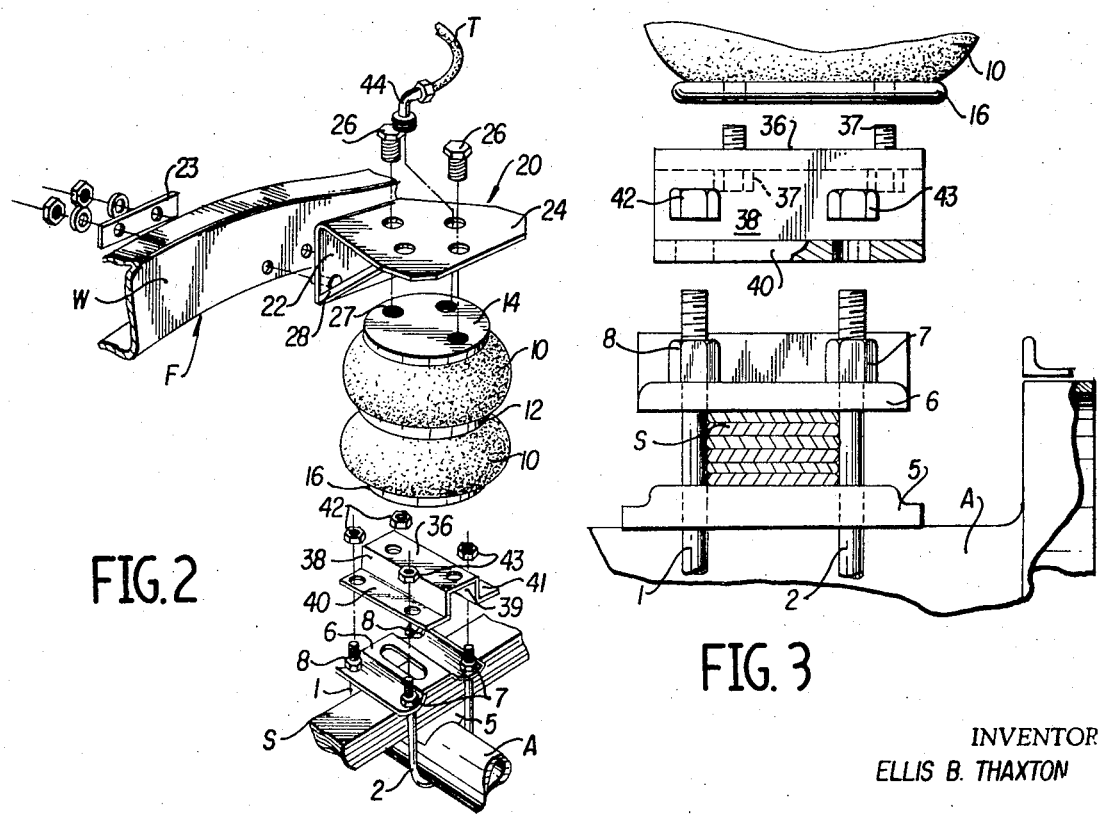
FIG. 2
FIG. 3
INVENTOR
ELLIS B. THAXTON
BY *Alexander & Dowell*
ATTORNEYS

AIR-SPRING ASSEMBLY FOR VEHICLES

This invention relates to an air-spring assembly having mounting means adapted to secure an inflatable body between a frame member and an axle member to resiliently support the latter on the former.

It is a principal object of this invention to provide an economical air-spring assembly especially useful as a primary or as an auxiliary spring means for supporting and/or leveling a vehicle frame above an axle.

It is another object of the invention to provide air-spring mounting means which is secure against accidental displacement from its selected position on the vehicle frame and axle members.

It is a further object of the invention to provide an air-spring assembly which can be assembled to existing frame and axle members using simple tools, and without interfering with already existing vehicle suspension means.

Other objects and advantages of the invention will become apparent during the following discussion of the drawing, wherein:

FIG. 1 is a perspective view showing an air-spring assembly according to the present invention mounted between the chassis frame and axle members of a vehicle;

FIG. 2 is an exploded perspective view showing the various vehicle members and the parts of the air-spring assembly somewhat enlarged as compared with FIG. 1; and FIG. 3 is a further enlarged partial detail view showing in elevation the lower air-spring mounting means.

Referring now to the drawing, FIG. 1 shows a partial view of a vehicle frame and suspension including a chassis frame member F in the form of a channel having two legs L and a web portion W. The vehicle also carries a source of pressure P which can include suitable valve and/or pressure meter means (not shown). The vehicle is supported upon an axle member A, which in this particular embodiment is an axle housing, but which might alternatively comprise a non-rotating axle supporting wheels at its outer end. The frame member F is supported on the axle member A by a conventional leaf spring S held in place on the axle by U-bolt means 1 and 2 in the usual manner, and the leaf springs S being supported at their outer ends by suitable shackle assemblies 3 and 4 attached to the frame member F. In the present illustration, the frame member F is arched over the axle member and the leaf springs S are located outwardly with respect to the vehicle frame F. The leak spring sits on a saddle block 5 and beneath a clamping plate 6 which is tightly drawn down thereon by the nuts 7 and 8 which comprise part of the vehicle structure as manufactured. As many air-spring assemblies as desired can be used on a vehicle, FIG. 1 showing only one such assembly mounted immediately above the leaf spring S.

Each air-spring assembly includes an elastomeric body 10, in the present illustration including two adjacent convolutions cynched in at the center by a ring 12 in a manner which is well known in the air-spring art. The elastomeric body includes upper and lower mounting plates 14 and 16 respectively. These plates are secured to beads (not shown) around the upper and lower peripheries of the elastomeric body 10 in a manner which is well known in the prior art and requires no further discussion since it is not considered novel in the present disclosure.

The upper plate 14 has an inverted L-shaped bracket 20 overlying it and having a vertical leg 22 and a horizontal leg 24. The vertical leg 22 is bolted to the web W of the frame member F by bolts and nuts passing through the web and through a backing plate 23 as can be seen in FIG. 2. The horizontal leg 24 of the bracket 20 is secured by bolts 26 screwed into tapped holes 27 in the upper end plate 14 of the air-spring body.

The L-shaped bracket 20 is made more rigid against distortion and breakage by diagonal reinforcing members 28 welded on each side of the bracket and extending from opposite lower corners of the vertical leg 22 to opposite sides of the horizontal leg 24. It will be noted that the horizontal leg 24 diverges as it extends outwardly from the vertical leg 22 so that the upper ends of the diagonal members 28 diverge, thereby also giving to the legs of the bracket 20 diagonal support against bending of the horizontal leg 24 or displacement thereof in a direction longitudinally of the frame member F.

The lower mounting means of the air-spring assembly comprises an inverted U-shaped bracket 35 including a raised central portion having an upper surface 36 which is secured against the lower plate 16 of the air-spring by bolts 37. The bracket 35 also includes two downwardly extending flange members 38 and 39 as can be seen in FIG. 2, and these terminate in horizontal foot members 40 and 41 having holes through them to receive the upper ends of the U-bolts 1 and 2 above the nuts 7 and 8. The U-bracket 35 is lowered over the upper ends of the U-bolts 1 and 2 and is secured thereon by nuts 42 and 43, thereby securing together the leaf spring mounting and the lower plate 16 of the air-spring for unitary motion.

Tubing T is coupled by suitable fittings between the source of pressure P and the air-spring body, which is entered either through the lower plate 16 or the upper plate 14 as desired for convenient mounting. In the present example, the tubing is shown in FIG. 1 as entering the body through the upper plate 14 by way of a fitting 44 which passes through a hole in the horizontal portion 24 of the L-shaped bracket 20 and is screwed into a tapped hole in the upper plate 14 which is not moveable during normal performance of the vehicle.

One feature of the present invention is that the upper mounting means and the lower mounting means which secure the air-spring assembly to the frame member F and to the axle member A are positively located by bolts passing through drilled holes, thereby avoiding any tendency of the supplemental air-spring assembly to slip with respect to the undisturbed original vehicle spring assembly parts.

The present invention is not to be limited to the exact form shown in the drawings for obviously changes can be made within the scope of the following claims:

I claim:

1. An air-spring assembly for mounting on a longitudinal frame member of a vehicle to support the latter with respect to an axle member extending transversely of the vehicle when pressurized from a pressure source, the vehicle having a leaf spring disposed parallel to the frame member and transversely offset therefrom and the axle member being attached to the leaf spring by U-bolts extending around the axle member on each side of the leaf spring and having their ends extending up through a clamping plate disposed across the top of the leaf spring, said air-spring assembly comprising a pressure inflatable elastomeric body oriented upright adjacent to the frame member and having upper and lower end plates closing the body and respectively located near the top of the frame member and near the axle member; upper mounting means comprising an L-shaped bracket having a verticle and a horizontal leg with diagonal reinforcing means extending between and secured to them, the vertical leg being fastened to the frame member with the horizontal leg extending from a level near the top of the frame member and overlying said upper end plate and being bolted thereto; and lower mounting means comprising an inverted U-bracket having a raised central portion bolted to said lower end plate and having downwardly extending flanges carrying feet with mounting holes receiving the upper ends of said U-bolts, and the U-bracket being secured by nuts superimposed upon said clamping plate.

2. In an assembly as set forth in claim 1, the L-shaped bracket having its verticle leg of one width as measured longitudinally of said frame member and having its horizontal leg enlarge outwardly from the vehicle leg to a greater width as measured in the same direction, and said diagonal reinforcing means comprising two diagonal members respectively fixed at their lower ends near opposite lower corners of said vertical leg and fixed at their upper ends near opposite outer ends of said horizontal leg, whereby the diagonal members diverge away from each other as measured longitudinally of said frame member.

* * * * *